United States Patent
Ito et al.

(10) Patent No.: US 12,397,819 B2
(45) Date of Patent: Aug. 26, 2025

(54) TRAVEL PATH GENERATION APPARATUS AND TRAVEL PATH GENERATION METHOD

(71) Applicant: Mitsubishi Electric Corporation, Tokyo (JP)

(72) Inventors: Rin Ito, Tokyo (JP); Hiroaki Kitano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 167 days.

(21) Appl. No.: 17/918,121

(22) PCT Filed: May 21, 2020

(86) PCT No.: PCT/JP2020/020060
§ 371 (c)(1),
(2) Date: Oct. 11, 2022

(87) PCT Pub. No.: WO2021/234895
PCT Pub. Date: Nov. 25, 2021

(65) Prior Publication Data
US 2023/0135242 A1    May 4, 2023

(51) Int. Cl.
*B60W 60/00* (2020.01)

(52) U.S. Cl.
CPC ..... *B60W 60/001* (2020.02); *B60W 2520/125* (2013.01); *B60W 2552/30* (2020.02); *B60W 2552/53* (2020.02)

(58) Field of Classification Search
CPC ......... B60W 60/001; B60W 2520/125; B60W 2552/30; B60W 2552/53
See application file for complete search history.

(56) References Cited

U.S. PATENT DOCUMENTS

| | | | |
|---|---|---|---|
| 10,732,642 B2 * | 8/2020 | Yasui | G05D 1/0248 |
| 10,913,457 B2 * | 2/2021 | Yasui | B60W 50/02 |

(Continued)

FOREIGN PATENT DOCUMENTS

JP    2018-62244 A    4/2018

OTHER PUBLICATIONS

International Search Report and Written Opinion mailed on Aug. 11, 2020, received for PCT Application PCT/JP2020/020060, filed on May 21, 2020, 8 pages including English Translation.

*Primary Examiner* — Aniss Chad
*Assistant Examiner* — Christopher George Fees
(74) *Attorney, Agent, or Firm* — XSENSUS LLP

(57) ABSTRACT

It is an object of the present disclosure to provide a travel path generation apparatus and a travel path generation method enabling generation of a travel path not including a curve having a small radius of curvature. A travel path generation apparatus according to the present disclosure includes: a parameter determination unit to determine a cutoff frequency based on spacing between points of a sequence of points each having location information and a predetermined threshold of a radius of curvature, the sequence of points representing a shape of a lane in which a vehicle travels in a two-dimensional or three-dimensional Cartesian coordinate system; and a filtering unit to perform low-pass filtering using the cutoff frequency determined by the parameter determination unit on the location information of each of the points of the sequence of points.

19 Claims, 12 Drawing Sheets

(56) References Cited

U.S. PATENT DOCUMENTS

| | | | | |
|---|---|---|---|---|
| 11,852,491 | B2* | 12/2023 | Takahama | B60W 60/001 |
| 2014/0012469 | A1* | 1/2014 | Kunihiro | B60W 40/072 |
| | | | | 701/41 |
| 2016/0031478 | A1* | 2/2016 | Shiraki | B62D 5/046 |
| | | | | 701/41 |
| 2017/0015351 | A1* | 1/2017 | Endo | B62D 6/00 |
| 2017/0364084 | A1* | 12/2017 | Sakima | B60W 40/072 |
| 2018/0099667 | A1* | 4/2018 | Abe | B60W 30/0956 |
| 2023/0017774 | A1* | 1/2023 | Giovanardi | B60W 40/06 |

* cited by examiner

TRAVEL PATH GENERATION APPARATUS AND TRAVEL PATH GENERATION METHOD

CROSS-REFERENCE TO RELATED APPLICATION

The present application is based on PCT filing PCT/JP2020/020060, filed May 21, 2020, the entire contents of which is incorporated herein by reference.

TECHNICAL FIELD

The present disclosure relates to travel path generation apparatuses and travel path generation methods to generate a travel path of a vehicle.

BACKGROUND ART

As a technique of generating a path along which a vehicle is to travel in autonomous driving, a technique of performing filtering on the shape of a travel lane (hereinafter also referred to as a "lane shape") obtained based on information detected by a peripheral recognition sensor, such as a camera, has been known (see Patent Document 1, for example). In Patent Document 1, a road boundary is detected using the peripheral recognition sensor, and filtering is performed on a provisional center line generated based on the detected information to obtain a center line based on which a travel path is generated.

PRIOR ART DOCUMENT

Patent Document

Patent Document 1: Japanese Patent Application Laid-Open No. 2018-62244

SUMMARY

Problem to be Solved by the Invention

In the technique disclosed in Patent Document 1, polynomial approximation is used as filtering. In such a technique, minor variations in lane shape are removed, but a general lane shape is held. Thus, when the lane shape includes a curve having a small radius of curvature, the curve having the small radius of curvature remains on the travel path after filtering. When the vehicle is controlled using the travel path including the curve having the small radius of curvature, lateral acceleration of the vehicle increases and vibrational behavior is caused to degrade a ride quality for an occupant. Furthermore, an end contact at which a steering angle reaches a maximum value sometimes causes power consumption and heating due to overload on an electric power steering (EPS) motor.

The present disclosure has been conceived to solve such a problem, and it is an object of the present disclosure to provide a travel path generation apparatus and a travel path generation method enabling generation of a travel path not including a curve having a small radius of curvature.

Means to Solve the Problem

To solve the above-mentioned problem, a travel path generation apparatus according to present disclosure includes: a parameter determination unit to determine a cutoff frequency based on spacing between points of a sequence of points each having location information and a predetermined threshold of a radius of curvature, the sequence of points representing a shape of a lane in which a vehicle travels in a two-dimensional or three-dimensional Cartesian coordinate system; and a filtering unit to perform low-pass filtering using the cutoff frequency determined by the parameter determination unit on the location information of each of the points of the sequence of points.

Effects of the Invention

According to the present disclosure, the parameter determination unit to determine the cutoff frequency based on spacing between points of the sequence of points each having location information and the predetermined threshold of the radius of curvature, the sequence of points representing the shape of the lane in which the vehicle travels in the two-dimensional or three-dimensional Cartesian coordinate system; and the filtering unit to perform low-pass filtering using the cutoff frequency determined by the parameter determination unit on the location information of each of the points of the sequence of points are included, so that a travel path not including a curve having a small radius of curvature can be generated.

The objects, features, aspects, and advantages of the present disclosure will become more apparent from the following detailed description and the accompanying drawings.

DESCRIPTION OF EMBODIMENTS

Embodiment 1

Figure 1:
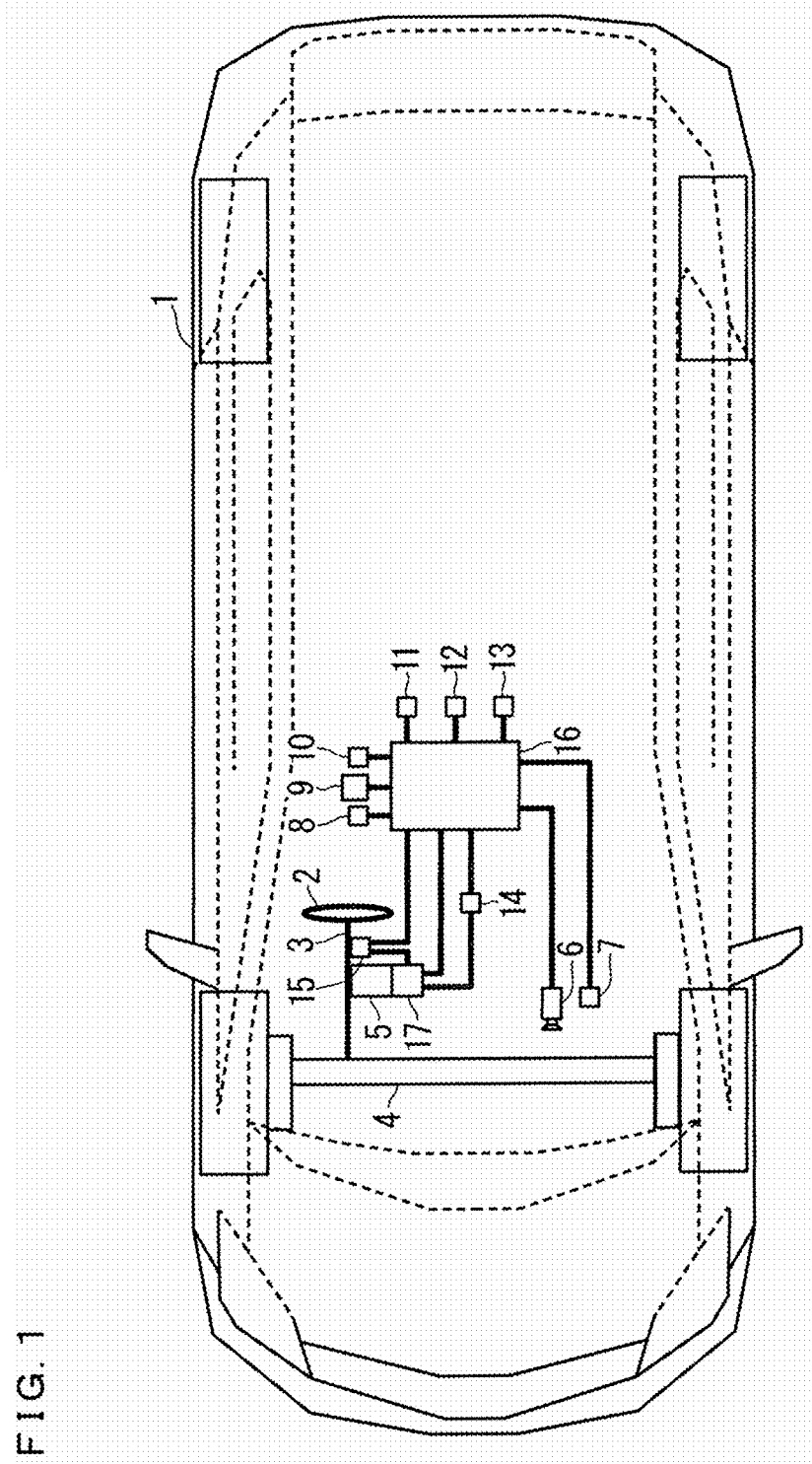
FIG. 1 illustrates an example of a configuration of a vehicle on which a travel path generation apparatus is mounted according to Embodiment 1.

FIG. 1 illustrates an example of a configuration of a vehicle 1 on which a travel path generation apparatus is mounted according to Embodiment 1.

As illustrated in FIG. 1, the vehicle 1 includes a steering wheel 2, a steering shaft 3, a steering unit 4, an EPS motor 5, a forward-facing camera 6, a ranging sensor 7, a global navigation satellite system (GNSS) sensor 8, a navigation apparatus 9, a vehicle-to-everything (V2X) receiver 10, a yaw rate sensor 11, a speed sensor 12, an acceleration sensor 13, a steering angle sensor 14, a steering torque sensor 15, a vehicle control unit 16, and an EPS controller 17.

The steering wheel 2 provided for a driver to operate the vehicle 1 is connected to the steering shaft 3. The steering unit 4 is linked to the steering shaft 3. The steering unit 4 pivotably supports front wheels as steering wheels, and is turnably supported by a vehicle body frame of the vehicle 1. Torque generated by the driver operating the steering wheel 2 thus rotates the steering shaft 3 to cause the steering unit 4 to turn the front wheels to the left and right. The driver can thus manipulate the amount of lateral movement of the vehicle 1 when the vehicle 1 moves forward or backward.

The steering shaft 3 can also be rotated by the EPS motor 5. In this case, the EPS controller 17 controls a current flowing through the EPS motor 5 to freely turn the front wheels independently of operation of the steering wheel 2 performed by the driver.

The vehicle control unit 16 is an integrated circuit, such as a microprocessor, and includes an A/D conversion circuit, a D/A conversion circuit, a central processing unit (CPU), read only memory (ROM), random access memory (RAM), and the like. The forward-facing camera 6, the ranging sensor 7, the GNSS sensor 8, the navigation apparatus 9, the V2X receiver 10, the yaw rate sensor 11, the speed sensor 12, the acceleration sensor 13, the steering angle sensor 14, the steering torque sensor 15, and the EPS controller 17 are connected to the vehicle control unit 16. The vehicle control unit 16 processes information input from each of the sensors connected thereto according to a program stored in the ROM, and transmits a target steering angle as a result of processing to the EPS controller 17.

The forward-facing camera 6 is disposed at a location where line markings present forward of the vehicle 1 can be detected as images, and detects an environment, such as a lane shape, forward of the vehicle 1 based on image information. The forward-facing camera 6 outputs a result of approximation of the detected lane shape forward of the vehicle 1 using a sequence of points, a polynomial, or a spline curve.

The ranging sensor 7 emits a radio wave, light, or a sound wave, and detects a reflected wave thereof to output a relative distance and a relative speed to an obstacle present around the vehicle 1. Examples of the ranging sensor 7 include a millimeter wave radar, light detection and ranging (LiDAR), a laser range finder, and a ultrasonic radar, and a known sensor can be used as the ranging sensor 7.

The GNSS sensor 8 receives a radio wave output from a positioning satellite via an antenna for positioning to thereby output the absolute location and the absolute orientation of the vehicle 1.

The navigation apparatus 9 has a function of computing an optimum travel path to a destination set by the driver, and stores road information along travel paths. The road information is map node data representing linearity of roads. Information on the absolute location (latitude, longitude, and altitude), a lane width, a cant angle, an inclination angle, and the like at each node is incorporated in the map node data.

The V2X receiver 10 has a function of acquiring and outputting various pieces of information by communicating with another vehicle or a roadside unit. Examples of information acquired by the V2X receiver 10 include information on the location and the speed of the other vehicle or a pedestrian, a vehicle-free area of a road due to construction and the like, and an environment around the vehicle 1. A V2X communication method may be one of dedicated short Dedicated Short Range Communications® (DSRC) and Cellular—V2X (C-V2X), and may be a communication method other than these communication methods. Assume that the V2X receiver 10 is adaptable to a communication method used by a communication target including the other vehicle and the roadside unit.

The yaw rate sensor 11 detects a yaw rate of the vehicle 1. The speed sensor 12 detects a speed of the vehicle 1. The acceleration sensor 13 detects acceleration of the vehicle 1. The steering angle sensor 14 detects a steering angle of the vehicle 1. The steering torque sensor 15 detects steering torque of the vehicle 1.

The EPS controller 17 controls the EPS motor 5 to achieve the target steering angle received from the vehicle control unit 16.

Figure 2:
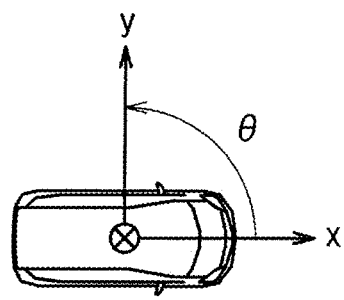
FIG. 2 illustrates an example of a Cartesian coordinate system according to Embodiment 1.

FIG. 2 schematically shows a host vehicle coordinate system (Cartesian coordinate system) according to Embodiment 1.

In FIG. 2, a point of origin is the center of gravity of the vehicle 1. An x-axis direction indicates a forward direction of the vehicle 1, and a y-axis direction indicates a direction to the left of the forward direction of the vehicle 1. An angle θ is positive in a counterclockwise direction from a positive direction of an x-axis as a reference orientation. While a two-dimensional Cartesian coordinate system is shown in FIG. 2, the host vehicle coordinate system may be three-dimensional.

Figure 3:
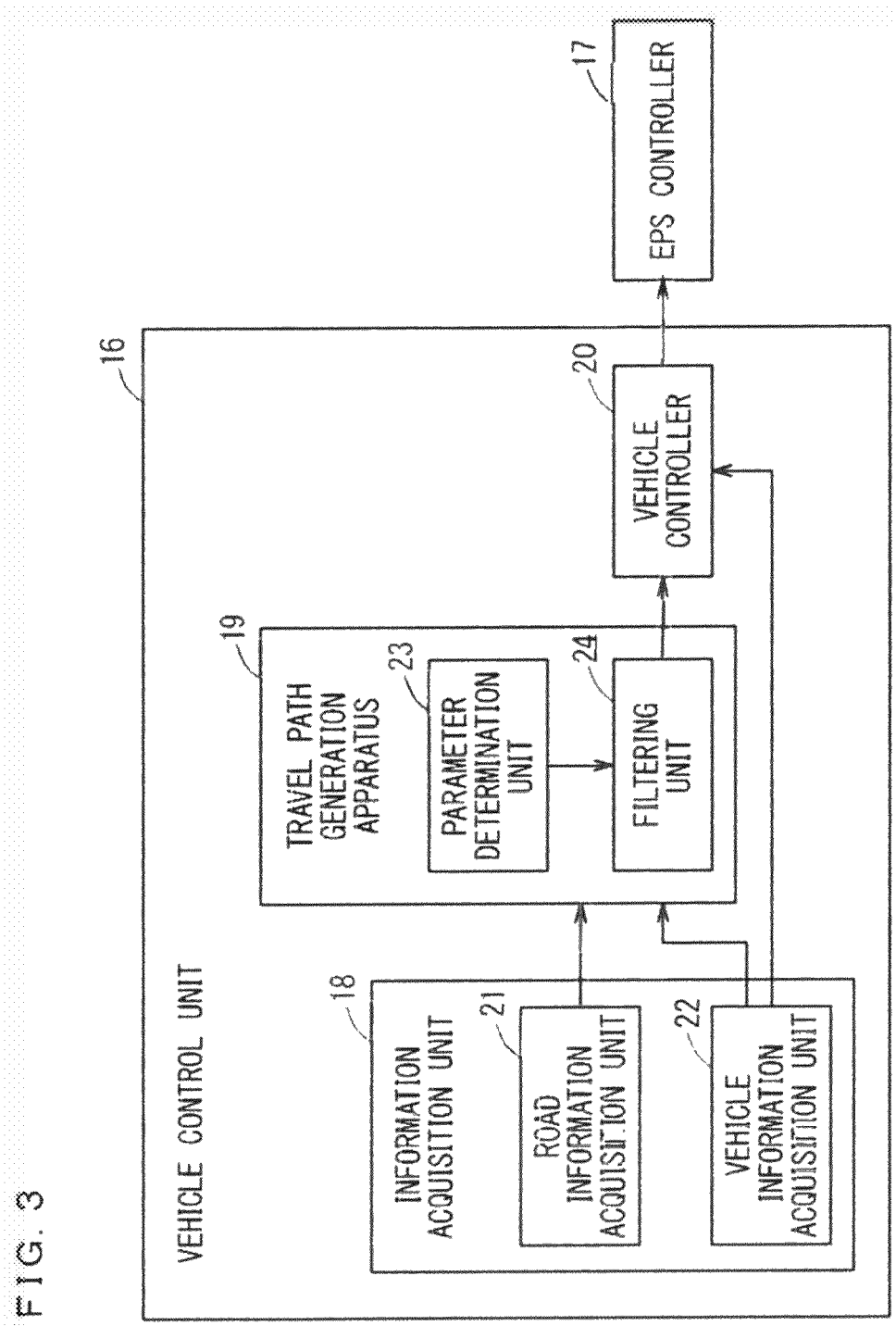
FIG. 3 is a block diagram showing an example of a configuration of a vehicle control unit including the travel path generation apparatus according to Embodiment 1.

FIG. 3 is a block diagram showing an example of a configuration of the vehicle control unit 16 including a travel path generation apparatus 19 according to Embodiment 1. The vehicle control unit 16 includes an information acquisition unit 18, the travel path generation apparatus 19, and a vehicle controller 20.

The information acquisition unit 18 has a function of acquiring information on the vehicle 1 and information on roads along which the vehicle 1 travels. Specifically, the information acquisition unit 18 includes a road information acquisition unit 21 and a vehicle information acquisition unit 22.

The road information acquisition unit 21 acquires the information on the roads along which the vehicle 1 travels from each of the sensors, the navigation apparatus 9, the V2X receiver 10, and the like shown in FIG. 1, and outputs the information as lane shape information. The lane shape information at least includes information obtained by converting a sequence of N points (N is a natural number) representing the lane shape into that in the host vehicle coordinate system shown in FIG. 2.

The vehicle information acquisition unit 22 acquires the information on the vehicle 1 from each of the sensors, the navigation apparatus 9, the V2X receiver 10, and the like shown in FIG. 1, and outputs the information as a vehicle state amount. The vehicle state amount at least includes information on the steering angle or the steering torque.

Assume in Embodiment 1 that the road information acquisition unit 21 converts information on the sequence of N points on map data near the vehicle 1 obtained by matching the road information stored in the navigation apparatus 9 and the absolute location of the vehicle 1 acquired from the GNSS sensor 8 into that in the host vehicle coordinate system, and outputs information obtained through conversion as the lane shape information. The location of a leading vehicle relative to the vehicle 1 acquired from the ranging sensor 7 may be stored, relative locations for past N points may be converted into those in a current host vehicle coordinate system, and information obtained through conversion may be output as the lane shape information. The lane shape acquired from the forward-facing camera 6 may also be output.

The travel path generation apparatus 19 has a function of computing a travel path along which the vehicle 1 is to travel in autonomous driving and a function of outputting travel path information as computed to the vehicle controller 20. The travel path generation apparatus 19 will be described in detail below.

The vehicle controller 20 has a function of computing the target steering angle relating to autonomous driving of the vehicle 1 based on the travel path information acquired from the travel path generation apparatus 19 and the vehicle state amount acquired from the vehicle information acquisition unit 22. The vehicle controller 20 transmits the computed target steering angle to the EPS controller 17.

The travel path generation apparatus 19 will be described below. As shown in FIG. 3, the travel path generation apparatus 19 includes a parameter determination unit 23 and a filtering unit 24.

The parameter determination unit 23 has a function of determining a cutoff frequency $\omega_c$ used for low-pass filtering based on the distance between adjacent points of a sequence of points representing the lane shape and a threshold $\rho_{th}$ of a radius of curvature, and outputting the determined cutoff frequency $\omega_c$ to the filtering unit 24.

Figure 4:
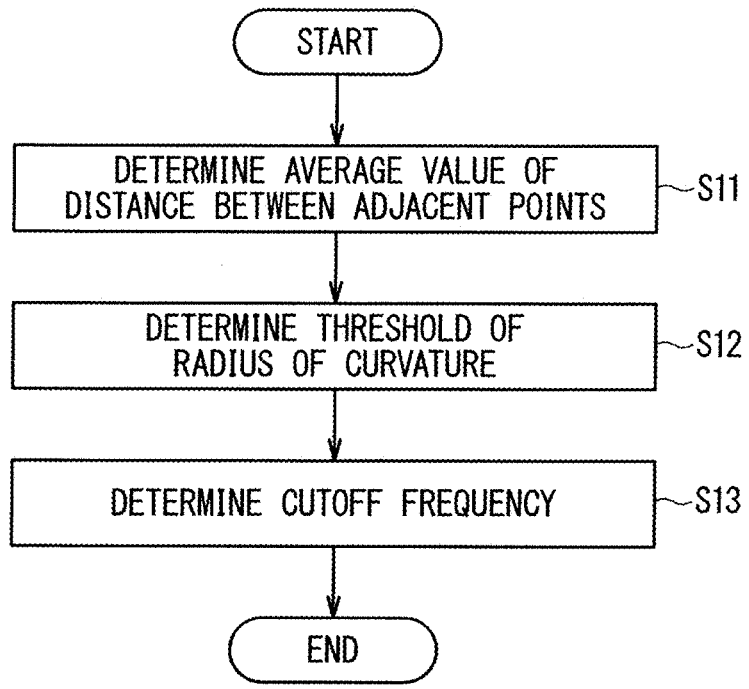
FIG. 4 is a flowchart showing an example of operation of a parameter determination unit according to Embodiment 1.

FIG. 4 is a flowchart showing an example of operation of the parameter determination unit 23.

In step S11, the parameter determination unit 23 determines an average value $\Delta d$ of the distance between adjacent points of the sequence of points representing the lane shape based on the lane shape information acquired from the road information acquisition unit 21. Assume that the lane shape information is represented by a sequence of points $\{P_i\}=\{P_1, P_2, P_3, \ldots, \text{and } P_N\}$ including N elements in Embodiment 1. Assume that each element $P_i$ of the sequence of points $\{P_i\}$ is represented by a location vector $(x_i, y_i)$ in the host vehicle coordinate system. That is to say, an equation $P_i=(x_i, y_i)$ holds.

Figure 5:
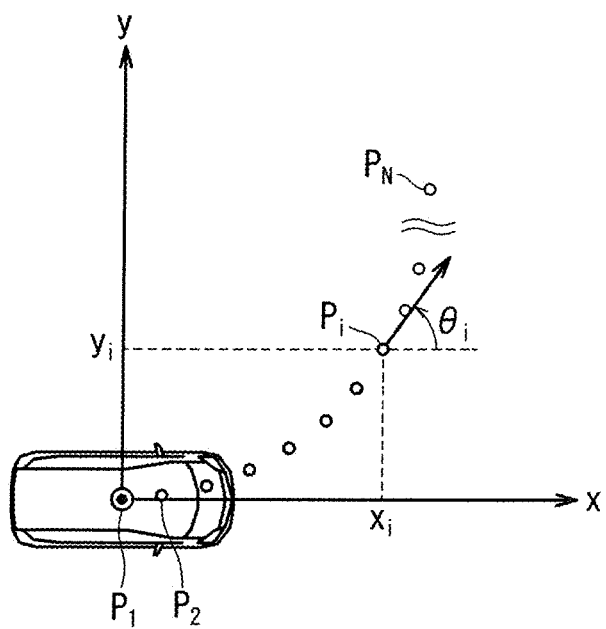
FIG. 5 shows an example of a sequence of points representing a lane shape according to Embodiment 1.

FIG. 5 schematically shows the sequence of points $\{P_i\}$. Sequences of values (location information) of the element $P_i$ along the axes in the Cartesian coordinate system are sequences of numbers $\{x_i\}$ and $\{y_i\}$. That is to say, an equation $\{x_i\}=\{x_1, x_2, x_3, \ldots, \text{and, } x_N\}$ and an equation $\{y_i\}=\{y_1, y_2, y_3, \ldots, \text{and } y_N\}$ hold.

In this case, the average value $\Delta d$ is determined by the following equation (1):

[Math 1]

$$\Delta d = \frac{1}{N-1} \sum_{i=1}^{N-1} \sqrt{(x_{i+1} - x_i)^2 + (y_{i+1} - y_i)^2} \tag{1}$$

The number of elements N may meet output specifications of the road information acquisition unit 21, but only the number of elements required for the vehicle controller 20 may be extracted. For example, when the vehicle controller 20 uses $t_r$ seconds of a path backward of the vehicle 1 and $t_f$ seconds of a path forward of the vehicle 1 for computation, the number of elements N is only required to be determined using a travel speed V of the vehicle 1 according to an equation (2) shown below. A processing load can be reduced by reducing the number of elements N to the minimum necessary as described above.

[Math 2]

$$N = V \cdot (t_r + t_f)/\Delta d \tag{2}$$

In step S12, the parameter determination unit 23 determines the threshold $\rho_{th}$ of the radius of curvature. In Embodiment 1, assume that threshold $\rho_{th}$ of the radius of curvature is a minimum turn radius $\rho_{min}$ of the vehicle 1.

In step S13, the parameter determination unit 23 determines the cutoff frequency $\omega_c$ based on the average value $\Delta d$ of the distance between adjacent points of the sequence of points representing the lane shape and the threshold $\rho_{th}$ of the radius of curvature.

How to determine the cutoff frequency $\omega_c$ to remove a component whose radius of curvature is equal to or smaller than the threshold $\rho_{th}$ from the lane shape will be described herein.

Assuming that the lane shape is a curve having a constant radius of curvature $\rho$, the values xi and yi are expressed by the following equations (3) and (4):

[Math 3]

$$x_i = \rho(\sin(\theta_i) - \sin(\theta_1)) + x_1 \tag{3}$$

[Math 4]

$$y_i = \rho(\cos(\theta_i) - \cos(\theta_1)) + y_1 \tag{4}$$

Herein, an angle $\theta_i$ takes a direction in which an element number i increases of a direction of tangent to the element $P_i$ of the curve, and is positive in the counterclockwise direction from the direction of the x-axis in the host vehicle coordinate system being zero. In this case, a distance $\Delta d_1$ between adjacent points is determined according to the following equations (5):

[Math 5]

$$\Delta d_i = \sqrt{(x_{i+1} - x_i)^2 + (y_{i+1} - y_i)^2} \tag{5}$$
$$= \rho\sqrt{2(1 - \cos(\theta_{i+1} - \theta_i))}$$
$$= 2\rho\left|\sin\left(\frac{\theta_{i+1} - \theta_i}{2}\right)\right|$$

An angular change $\Delta\theta_i$ of a tangent vector is expressed by an equation $\Delta\theta_i = \theta_{i+1} - \theta_i$. Assuming that the angular change $\Delta\theta_i$ is sufficiently small, the distance $\Delta d_i$ can be approximated as in an equation $\Delta d_i = \rho |\Delta\theta_i|$.

Furthermore, assuming that variations in distance $\Delta d_i$ of the sequence of points $\{P_i\}$ are small and the distance $\Delta d_i$ can be approximated by the average value $\Delta d$, the angular change $\Delta\theta_i$ can also be approximated by the average value $\Delta\theta$. Assume that a positive or negative sign of the angular change $\Delta\theta_i$ is the same for each element of the sequence of points $\{P_i\}$. In this case, the angle $\theta_i$ can be expressed by an equation $\theta_i = \theta_1 + \Delta\theta \cdot i$, and the values xi and yi can be rewritten as shown in the following equations (6) and (7):

[Math 6]

$$x_i = \rho(\sin(\theta_i + \Delta\theta \cdot i) - \sin(\theta_1)) + x_1 \quad (6)$$

[Math 7]

$$y_i = \rho(\cos(\theta_i + \Delta\theta \cdot i) - \cos(\theta_1)) + y_1 \quad (7)$$

When the sequences of numbers $\{x_i\}$ and $\{y_i\}$ are signals of a sampling frequency $F_s$, elements representing the curve having the radius of curvature $\rho$ can be components whose angular frequency $\omega$ satisfies an equation $\omega = F_s |\Delta\theta| = F_s \Delta d/\rho$. The cutoff frequency $\omega_c$ used for low-pass filtering is thus only required to satisfy an equation $\omega_c = F_s \Delta d/\rho_{th}$ to remove a component whose radius of curvature falls below the threshold $\rho_{th}$ from the lane shape. An equation $\omega_c = \Delta d/\rho_{th}$ can herein be obtained when an equation $F_s = 1$ is satisfied.

The parameter determination unit 23 outputs the cutoff frequency $\omega_c$ determined by the above-mentioned method to the filtering unit 24, and ends operation.

The filtering unit 24 has a function of performing low-pass filtering using the cutoff frequency $\omega_c$ acquired from the parameter determination unit 23 on the values $\{x_i\}$ and $\{y_i\}$ along the axes in the Cartesian coordinate system of the sequence of points representing the lane shape, and outputting the values obtained through low-pass filtering to the vehicle controller 20.

Figure 6:
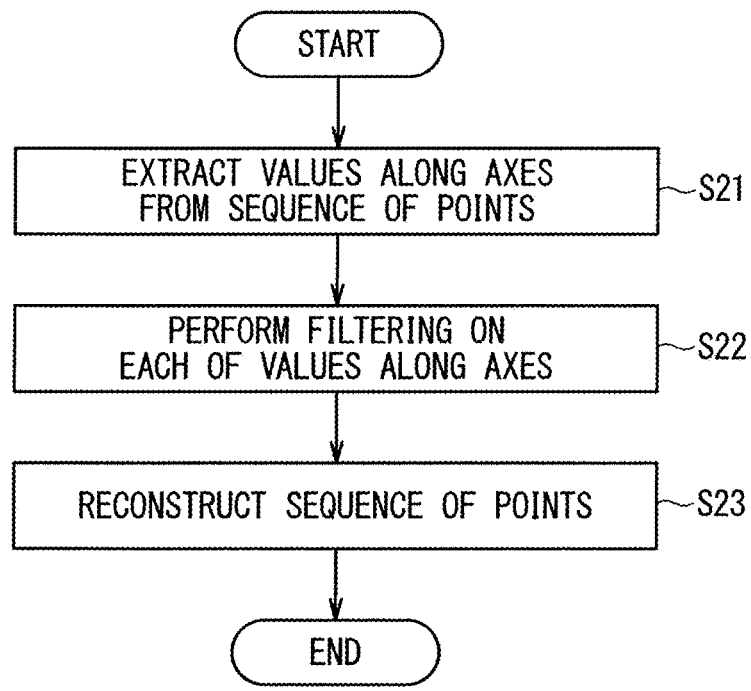
FIG. 6 is a flowchart showing an example of operation of a filtering unit according to Embodiment 1.

FIG. 6 is a flowchart showing an example of operation of the filtering unit 24.

In step S21, the filtering unit 24 extracts the values along the axes from the sequence of points $\{P_i\}$ as the sequences of numbers $\{x_i\}$ and $\{y_i\}$.

In step S22, the filtering unit 24 performs low-pass filtering using the cutoff frequency $\omega_c$ acquired from the parameter determination unit 23 on each of the sequences of numbers $\{x_i\}$ and $\{y_i\}$. Sequences of numbers obtained through low-pass filtering are referred to as $\{x_i'\}$ and $\{y_i'\}$.

As a low-pass filter, an infinite impulse response filter including the Butterworth filter, the type I Chebyshev filter, the type II Chebyshev filter, and an elliptic filter or a finite impulse response filter can be used, for example. These filters are sometimes generically referred to as a "digital filter".

While a case where low-pass filtering is performed on each of the sequences of numbers only in a forward direction has been described in Embodiment 1, but a direction of low-pass filtering is not limited to the forward direction. For example, low-pass filtering may be performed again in a reverse direction on sequence of points obtained through low-pass filtering performed on each of the sequences of numbers in the forward direction. Distortion caused when low-pass filtering is performed in a single direction can thereby be eliminated.

In step S23, a sequence of points $\{P_i'\}$ is reconstructed from the sequences of numbers $\{x_i'\}$ and $\{y_i'\}$. That is to say, the sequence of points $\{P_i'\}$ satisfies an equation $\{P_i'\} = \{P_1', P_2', P_3', \ldots, \text{ and } P_N'\}$. In this case, an equation $P_i' = (x_i', y_i')$ holds.

Figure 7:
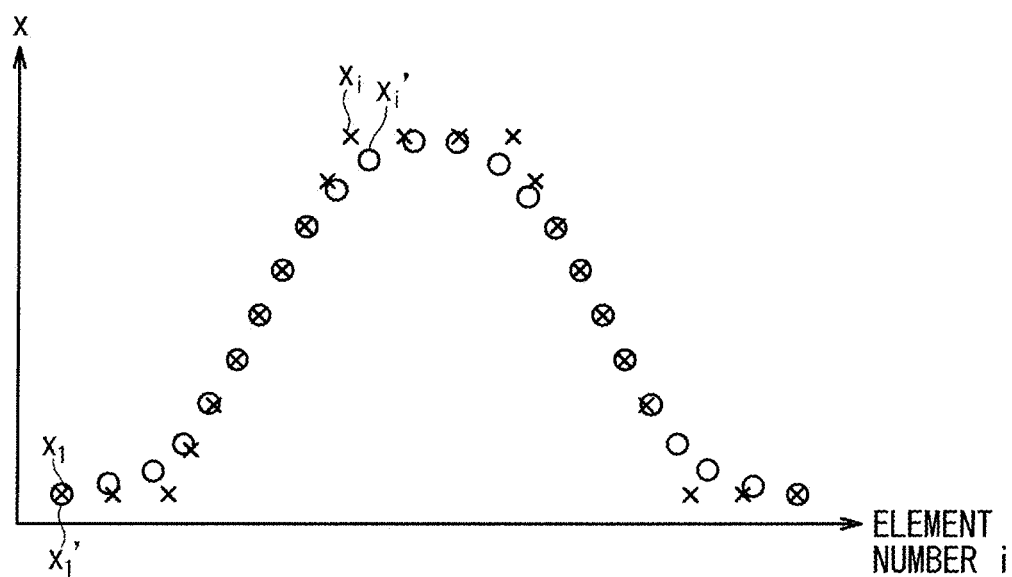
FIG. 7 shows a change in values along an x-axis before and after low-pass filtering according to Embodiment 1.
Figure 8:
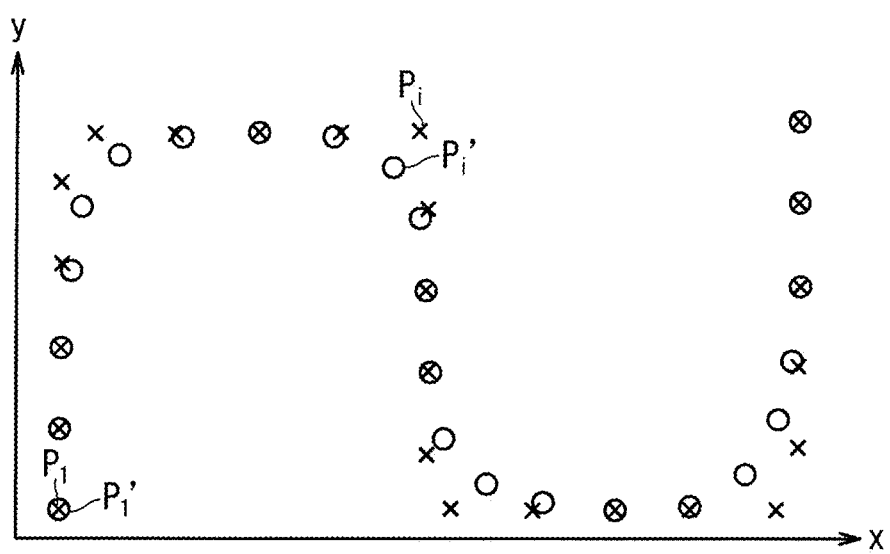
FIG. 8 shows a change in sequence of points before and after low-pass filtering according to Embodiment 1.

FIG. 7 shows a change in values along the x-axis before and after low-pass filtering, and shows a relationship between the sequences of numbers $\{x_i\}$ and $\{x_i'\}$. FIG. 8 shows a change in sequence of points before and after low-pass filtering, and shows a relationship between the sequences of points $\{P_i\}$ and $\{P_i'\}$.

In FIG. 7, crosses indicate the sequence of numbers $\{x_i\}$ before low-pass filtering, and circles indicate the sequence of numbers $\{x_i'\}$ after low-pass filtering. In FIG. 8, crosses indicate the sequence of points $\{P_i\}$ before low-pass filtering, and circles indicate the sequence of points $\{P_i'\}$ after low-pass filtering.

The filtering unit 24 outputs the sequence of points $\{P_i'\}$ (travel path information) determined by the above-mentioned method to the vehicle controller 20, and ends operation.

As described above, according to Embodiment 1, the component whose radius of curvature is equal to or smaller than the threshold is removed from the lane shape by low-pass filtering, and the travel path having the radius of curvature greater than the threshold can be obtained. An increase in lateral acceleration of the vehicle and vibrational behavior caused due to travel on a curve having a small radius of curvature are thereby suppressed, and an autonomous driving system allowing for high ride quality driving can be achieved. The steering angle is suppressed, so that overload due to an end contact of the EPS motor is prevented to suppress power consumption and heating.

Embodiment 2

A case where the parameter determination unit 23 and the filtering unit 24 directly use the lane shape information acquired from the road information acquisition unit 21 has been described in Embodiment 1. A case where the parameter determination unit 23 and the filtering unit 24 use a sequence of points obtained by converting the sequence of points included in the lane shape information acquired from the road information acquisition unit 21 into a sequence of points including equally spaced points will be described in Embodiment 2.

Figure 9:
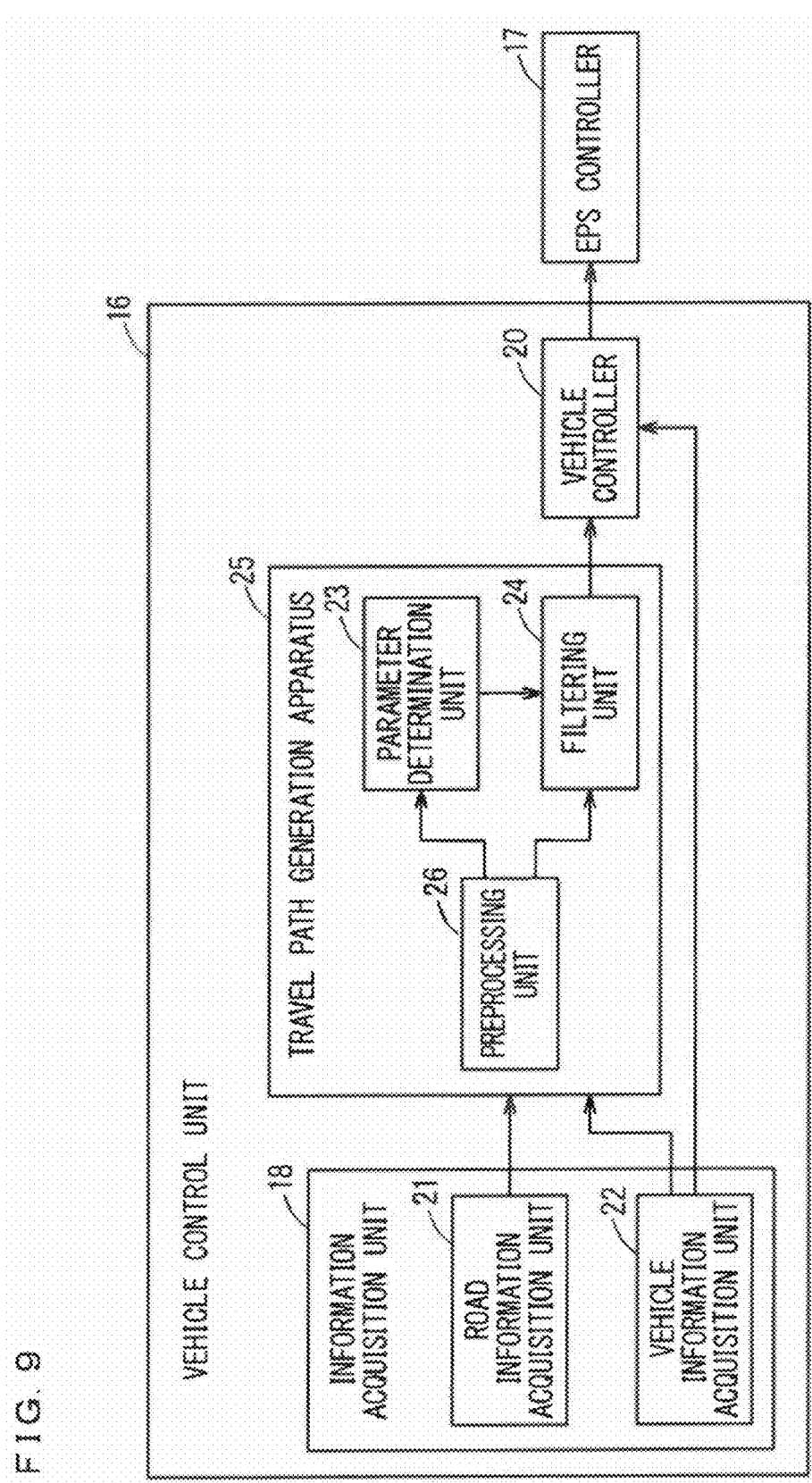
FIG. 9 is a block diagram showing an example of a configuration of a vehicle control unit including a travel path generation apparatus according to Embodiment 2.

FIG. 9 is a block diagram showing an example of a configuration of the vehicle control unit 16 including a travel path generation apparatus 25 according to Embodiment 2. As shown in FIG. 9, the travel path generation apparatus 25 includes a preprocessing unit 26. The other configuration and operation are similar to those of the travel path generation apparatus 19 shown in FIG. 3 described in Embodiment 1, and thus detailed description thereof will be omitted herein.

The preprocessing unit 26 has a function of converting the sequence of points representing the lane shape into a sequence of points including equally spaced points having a constant distance between adjacent points, and outputting the sequence of points obtained through conversion to each of the parameter determination unit 23 and the filtering unit 24.

Figure 10:
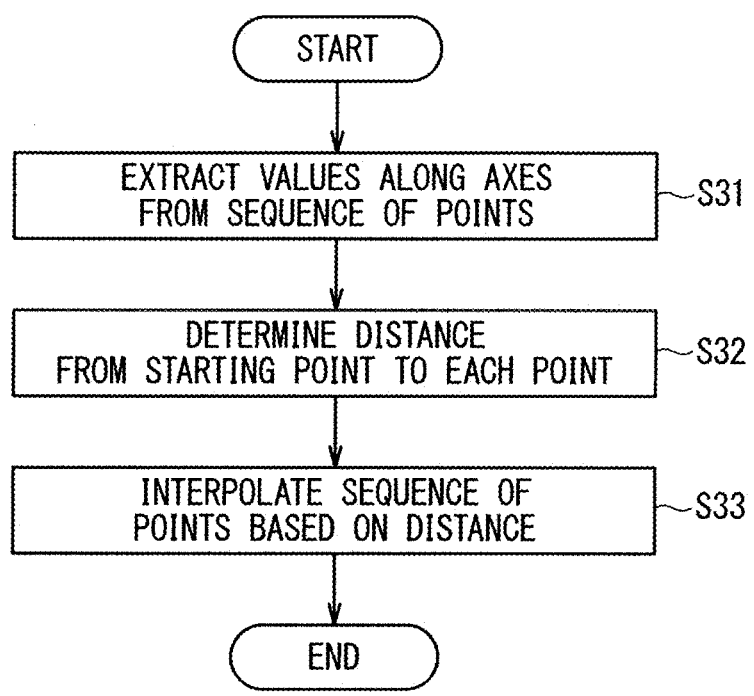
FIG. 10 is a flowchart showing an example of operation of a preprocessing unit according to Embodiment 2.

FIG. 10 is a flowchart showing an example of operation of the preprocessing unit 26.

In step S31, the preprocessing unit 26 extracts the values along the axes from the sequence of points $\{P_i\}$ as the sequences of numbers $\{x_1\}$ and $\{y_i\}$.

In step S32, the preprocessing unit 26 determines a sequence of numbers $\{d_i\}$ representing the distance from a starting point $P_0$ to each point $P_i$ based on the sequences of numbers $\{x_i\}$ and $\{y_i\}$. The preprocessing unit 26 determines a sequence of numbers $\{d_i''\}$ representing the distance to each of the equally spaced points of the sequence of points from a distance $d_N$ to an ending point $P_N$ according to the following equation (8):

[Math 8]

$$d_i'' = \frac{d_N}{N-1}(i-1) \qquad (8)$$

In step S33, the preprocessing unit 26 interpolates the sequence of points $\{P_i\}$ using the sequences of numbers $\{d_i\}$ and $\{d_i''\}$ to determine the sequence of points including the equally spaced points $\{P_i''\}$. In this case, each element $P_i''$ of the sequence of points is expressed by the following equation (9):

[Math 9]

$$P_i'' = \begin{cases} P_1, \ i = 1 \\ \dfrac{P_j(d_{j+1} - d_i'') + P_{j+1}(d_i'' - d_j)}{d_{j+1} - d_j}, \ (d_i'' > d_j, d_i'' \le d_{j+1}) \end{cases} \qquad (9)$$

While a case where linear interpolation is used has been described as an example in Embodiment 2, another type of interpolation, such as polynomial interpolation, spline interpolation, nearest neighbor interpolation, and parabolic interpolation, may be used.

The preprocessing unit 26 outputs the sequence of points including the equally spaced points $\{P_i''\}$ determined by the above-mentioned method to each of the parameter determination unit 23 and the filtering unit 24, and ends operation.

As described above, according to Embodiment 2, even when spacing between points of the sequence of points representing the lane shape acquired from the road information acquisition unit 21 varies greatly, reduction in accuracy of low-pass filtering performed by the filtering unit 24 can be prevented through conversion into the sequence of points including the equally spaced points.

Embodiment 3

Description has been made in Embodiment 2 based on the assumption that the lane shape information acquired from the road information acquisition unit 21 is represented by the sequence of points $\{P_i\}$ including N elements. A case where the lane shape information is represented by a parameter, such as a polynomial and a spline curve, and the sequence of points $\{P_i\}$ including N elements is generated from the parameter will be described in Embodiment 3.

Figure 11:
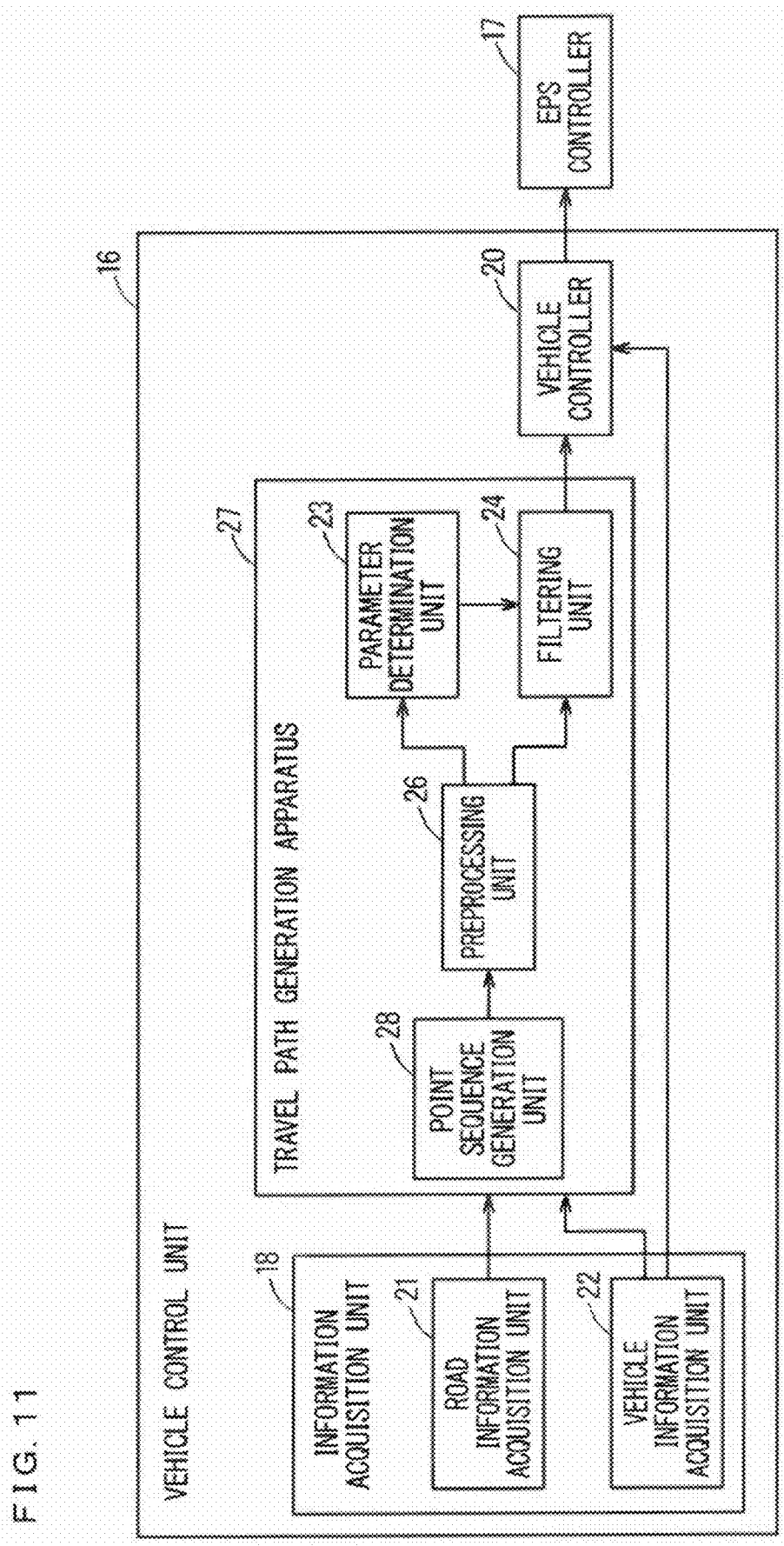
FIG. 11 is a block diagram showing an example of a configuration of a vehicle control unit including a travel path generation apparatus according to Embodiment 3.

FIG. 11 is a block diagram showing an example of a configuration of the vehicle control unit 16 including a travel path generation apparatus 27 according to Embodiment 3. As shown in FIG. 11, the travel path generation apparatus 27 includes a point sequence generation unit 28. The other configuration and operation are similar to those of the travel path generation apparatus 25 shown in FIG. 9 described in Embodiment 2, and thus detailed description thereof will be omitted herein.

The point sequence generation unit 28 has a function of generating the sequence of points $\{P_1\}$ including N elements from the parameter.

When the lane shape is represented by a third order polynomial in x, for example, the parameter includes four parameters $C_0$, $C_1$, $C_2$, and $C_3$, and the lane shape is expressed by the following equations (10) and (11):

[Math 10]

$$y = f(x) \qquad (10)$$

[Math 11]

$$f(x) = C_3 \cdot x^3 + C_2 \cdot x^2 + C_1 \cdot x + C_0 \qquad (11)$$

In this case, the sequence of points $\{P_i\}$ is determined according to the following equation (12):

[Math 12]

$$P_i = (x_i, f(x_i)) \qquad (12)$$

The sequence of numbers $\{x_i\}$, however, is a sequence of monotonically increasing numbers, and an equation $x_i = \Delta d_c \cdot i$ is only required to be satisfied using a distance $\Delta d_c$, for example. The distance $\Delta d_c$ may have a fixed value, but a greater value may be set as the travel speed V of the vehicle 1 increases.

As described above, according to Embodiment 3, processing similar to that performed in Embodiment 2 can be performed even when the lane shape information acquired from the road information acquisition unit 21 is represented by the parameter.

While a case where the point sequence generation unit 28 is applied to Embodiment 2 has been described above, the point sequence generation unit 28 may be applied to Embodiment 1.

Embodiment 4

Figure 12:
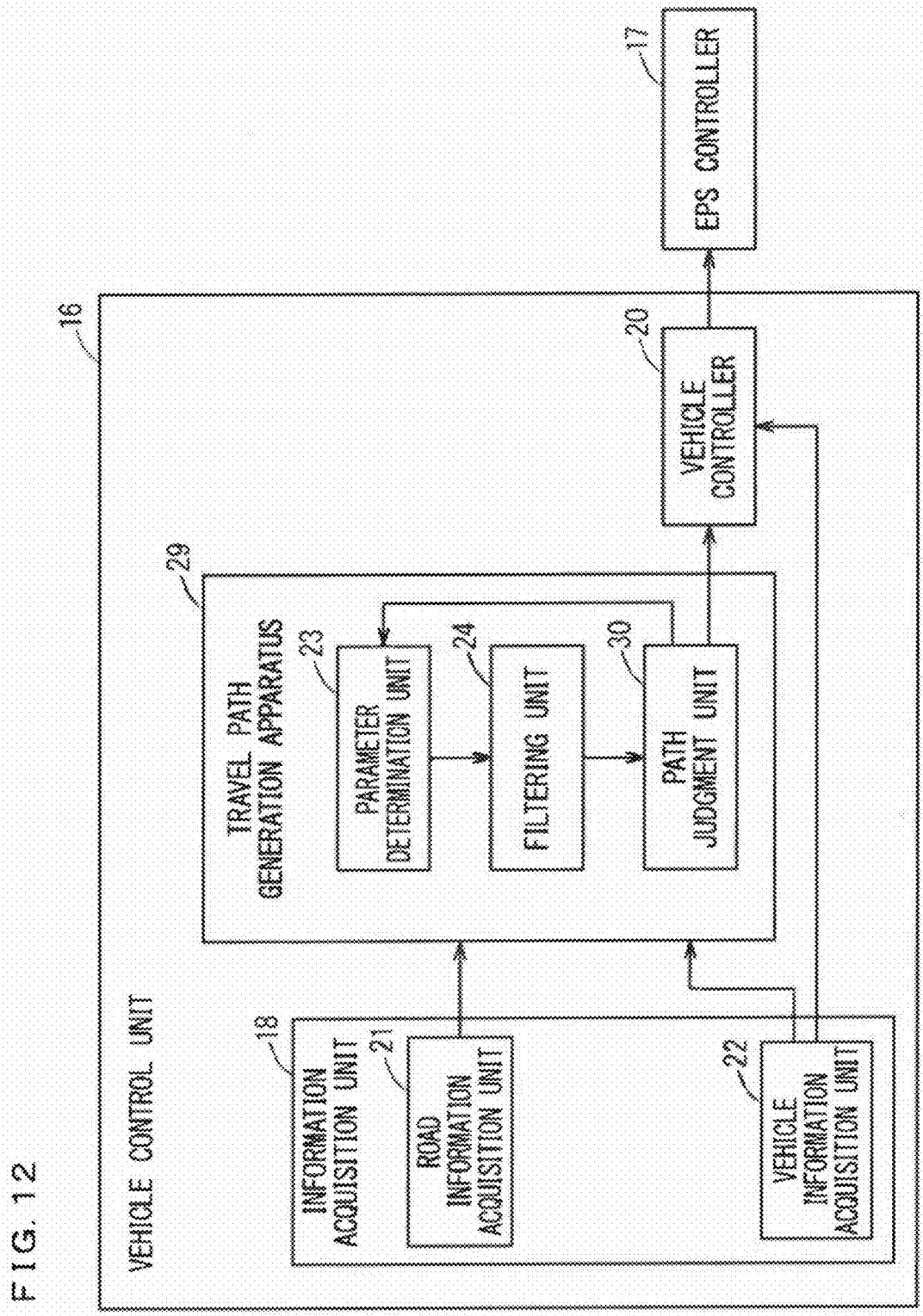
FIG. 12 is a block diagram showing an example of a configuration of a vehicle control unit including a travel path generation apparatus according to Embodiment 4.

FIG. 12 is a block diagram showing an example of a configuration of the vehicle control unit 16 including a travel path generation apparatus 29 according to Embodiment 4. As shown in FIG. 12, the travel path generation apparatus 29 includes a path judgment unit 30. The other configuration and operation are similar to those of the travel path generation apparatus 19 shown in FIG. 3 described in Embodiment 1, and thus detailed description thereof will be omitted herein.

The path judgment unit 30 has a function of calculating a deviation degree D of a path represented by the sequence of points $\{P_i'\}$ acquired from the filtering unit 24. The deviation degree D is deviation probability indicating a likelihood of deviation from a path along which the vehicle 1 travels, and is calculated based on an allowable travel area acquired from the information acquisition unit 18.

When the deviation degree D calculated by the path judgment unit 30 has a value greater than a threshold $D_{th}$, the parameter determination unit 23 changes the threshold $\rho_{th}$ of the radius of curvature to determine the cutoff frequency $\omega_c$. In this case, the parameter determination unit 23 changes the threshold $\rho_{th}$ of the radius of curvature to a value r times a previous value, for example. The filtering unit 24 performs low-pass filtering using the cutoff frequency $\omega_c$ determined by the parameter determination unit 23. Such processing is repeated until the deviation degree D becomes equal to or smaller than the threshold $D_{th}$.

The previous value is herein the minimum turn radius $\rho_{min}$ of the vehicle 1, for example, when such processing is repeated for the first time, and is a previous value of the threshold $\rho_{th}$ of the radius of curvature when such processing is repeated for the second and subsequent times. The threshold $\rho_{th}$ of the radius of curvature is preferably changed by small increments so that the radius of curvature does not excessively increase and the deviation degree D monotonically decreases. An equation r=1.2 holds, for example. A value of r may be increased in a case where a rate of decrease of the deviation degree D is small even when the threshold $\rho_{th}$ of the radius of curvature is changed.

The threshold $\rho_{th}$ of the radius of curvature may be determined not by a ratio to the previous value but by a difference from the previous value. That is to say, a value obtained by increasing the previous value of the threshold $\rho_{th}$ of the radius of curvature by a difference $\Delta\rho_{th}$ is determined as a new threshold $\rho_{th}$. In this case, the difference $\Delta\rho_{th}$ is preferably a value that does not excessively increase the radius of curvature, and allows the deviation degree D to monotonically decrease. For example, the difference $\Delta\rho_{th}$ is a value proportional to a difference $D-D_{th}$ between the deviation degree D and the threshold $D_{th}$ thereof, that is, an equation $\Delta\rho_{th}=\alpha(D-D_{th})$ holds. Herein, $\alpha$ is a coefficient, and may be changed as appropriate depending on the rate of decrease of the deviation degree D.

As described above, according to Embodiment 4, even when the path determined using the threshold $\rho_{th}$ of the radius of curvature set first deviates from the allowable travel area, the path that does not deviate from the allowable travel area is more likely to be obtained by repeating processing while changing the threshold $\rho_{th}$ of the radius of curvature. Embodiment 4 is applicable to each of Embodiments 1 to 3.

Embodiment 5

Figure 13:
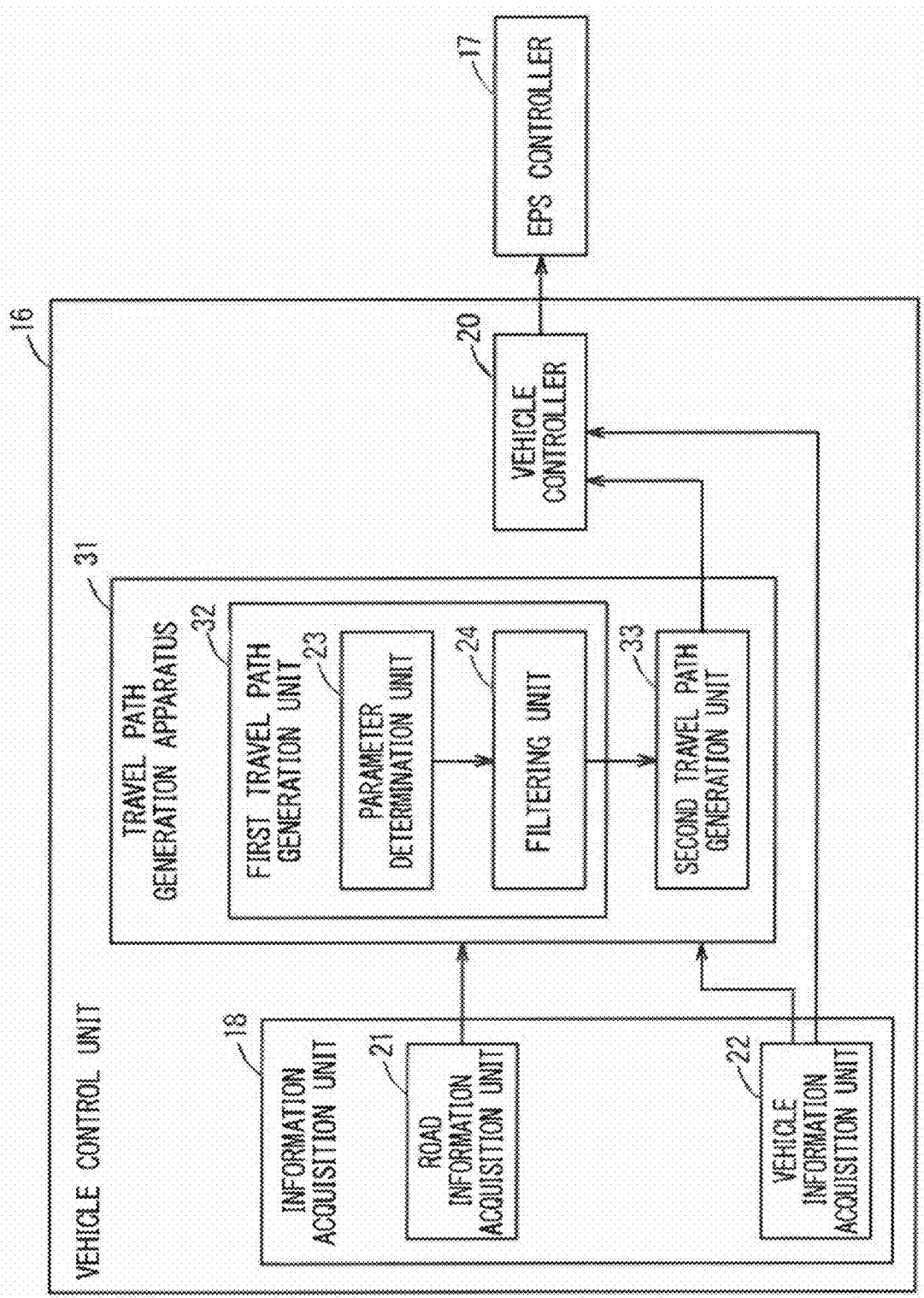
FIG. 13 is a block diagram showing an example of a configuration of a vehicle control unit including a travel path generation apparatus according to Embodiment 5.

FIG. 13 is a block diagram showing an example of a configuration of the vehicle control unit 16 including a travel path generation apparatus 31 according to Embodiment 5. As shown in FIG. 13, the travel path generation apparatus 31 includes a second travel path generation unit 33. The parameter determination unit 23 and the filtering unit 24 of a first travel path generation unit 32 are similar to those of the travel path generation apparatus 19 shown in FIG. 3 described in Embodiment 1, and thus detailed description thereof will be omitted herein.

The second travel path generation unit 33 generates a second travel path with reference to a first travel path acquired from the first travel path generation unit 32. The second travel path can be generated using a basic path generation method, such as a state lattice and a rapidly exploring random tree, an optimization method using a mathematical model of vehicle motion, a vehicle motion prediction method using state estimation, a method of selecting an optimum path from a plurality of paths generated based on a reference path, and the like.

As described above, according to Embodiment 5, a path more suitable for vehicle control can be obtained by the second travel path generation unit 33 imposing constraints not considered by the first travel path generation unit 32, such as detailed motion characteristics of the vehicle. Embodiment 5 is applicable to each of Embodiments 1 to 4.

Embodiment 6

A case where the threshold $\rho_{th}$ of the radius of curvature is the minimum turn radius $\rho_{min}$ of the vehicle has been described in Embodiment 1. A case where the threshold $\rho_{th}$ of the radius of curvature is determined based on the travel speed V of the vehicle 1 and an upper limit $a_{max}$ relating to acceleration in a y direction as a lateral direction of the vehicle 1 will be described in Embodiment 6. The threshold $\rho_{th}$ of the radius of curvature is determined by the parameter determination unit 23. Embodiment 6 is applicable to each of Embodiments 1 to 5.

How to determine the threshold $\rho_{th}$ of the radius of curvature in Embodiment 6 will be described below.

In a case of travel along the curve having the radius of curvature $\rho$ at the speed V, acceleration a in the y direction is expressed by an equation $a=V^2/\rho$. For the upper limit $a_{max}$ of acceleration a in the y direction, the threshold $\rho_{th}$ of the radius of curvature is only required to be expressed by an equation $\rho_{th}=V^2/a_{max}$. The upper limit $a_{max}$ is a tuning parameter relating to a ride quality.

As described above, according to Embodiment 6, the ride quality can further be improved by suppressing acceleration in the y direction to a certain value or less.

Embodiment 7

A case where the threshold $\rho_{th}$ of the radius of curvature is determined based on the travel speed V of the vehicle 1 and a coefficient of friction $\mu$ between a tire and a road surface will be described in Embodiment 7. Embodiment 7 is applicable to each of Embodiments 1 to 5.

How to determine the threshold $\rho_{th}$ of the radius of curvature in Embodiment 7 will be described below.

When the coefficient of friction between the tire and the road surface is $\mu$, an upper limit $a\mu$ of acceleration of the vehicle 1 is expressed by the following equation (13):

[Math 13]

$$a \leq a_\mu = \mu g \tag{13}$$

Herein, g is gravitational acceleration. In this case, the radius of curvature allowing for travel at the travel speed V is determined according to an equation (14) shown below. The threshold $\rho_{th}$ of the radius of curvature is thus only required to satisfy an equation $\rho_{th}=V^2/\mu g$.

[Math 14]

$$\rho \geq \frac{V^2}{a_\mu} = \frac{V^2}{\mu g} \tag{14}$$

As described above, according to Embodiment 7, even when the coefficient of friction between the tire and the road surface is small, a slip of the vehicle 1 can be suppressed to achieve safer travel by reducing acceleration by a turn.

Embodiment 8

In Embodiment 8, the threshold $\rho_{th}$ of the radius of curvature is a maximum value of the plurality of thresholds determined based on the minimum turn radius $\rho_{min}$ of the vehicle 1, the travel speed V of the vehicle, the upper limit $a_{max}$ relating to acceleration in the y direction, and the coefficient of friction $\mu$ between the tire of the vehicle 1 and the road surface. Embodiment 8 is applicable to each of Embodiments 1 to 5.

As described above, according to Embodiment 8, a path can be obtained in view of motion characteristics and a load on the EPS motor, the ride quality, and safety of the vehicle 1.

Embodiment 9

In Embodiment 9, with respect to a threshold $\rho_{th}'$ of the radius of curvature determined provisionally based on at least one of the minimum turn radius $\rho_{min}$ of the vehicle 1, the travel speed V of the vehicle 1 and the upper limit $a_{max}$ relating to acceleration in the y direction, and the travel speed V of the vehicle 1 and the coefficient of friction μ between the tire of the vehicle 1 and the road surface, the threshold $\rho_{th}$ of the radius of curvature is corrected based on a lateral width of the vehicle 1, the lane width, curvature of the lane, and an angular change of the lane. Embodiment 9 is applicable to each of Embodiments 1 to 5.

How to determine the threshold $\rho_{th}$ of the radius of curvature in Embodiment 9 will be described below.

Curvature and a direction of tangent at each point of the sequence of points $\{P_i\}$ representing the lane shape are $\rho_i$ and $\theta_i$, respectively. The sequence of points $\{P_i\}$ is divided into sections each having a certain radius of curvature, and a starting point, an ending point, and curvature of the k-th section are $a_k$, $b_k$, and $\rho_{ck}$, respectively. That is to say, an equation $\rho_i = \rho_{ck}(a_k \leq i \leq b_k, k=1 \ldots M, a_1=1, b_M=N)$ holds.

In this case, an angular change $\Delta\theta_k$ from the starting point to the ending point of the k-th section is expressed by an equation $\Delta\theta_k = \theta_{bk} - \theta_{ak}$. Assuming that sections before and after the k-th section are straight lines, displacement in a direction perpendicular to the tangent has a maximum value $\Delta w_{max}$ at the center of the k-th section when the radius of curvature of the k-th section is increased from $\rho_{ck}$ to $\rho_{ck}'$, and the maximum value $\Delta w_{max}$ is expressed by the following equation (15):

[Math 15]

$$\Delta w_{max} = (\rho_{ck}' - \rho_{ck}) \frac{1 - \cos(\Delta\theta_k)}{\cos(\Delta\theta_k)} \quad (15)$$

A lateral width $w_v$ of the vehicle 1 and a lane width $w_l$ are required to satisfy an equation (16) shown below so that the vehicle 1 does not protrude from the lane when traveling at the center of the path.

[Math 16]

$$\frac{w_l}{2} - \Delta w_{max} > \frac{w_v}{2} \quad (16)$$

A radius of curvature $\rho_{ck}'$ of the k-th section after filtering is thus required to satisfy the following equation (17):

[Math 17]

$$\rho_{ck}' \leq \rho_{ck} + \frac{w_l - w_v}{2} \cdot \frac{\cos(\Delta\theta_k)}{1 - \cos(\Delta\theta_k)} \quad (17)$$

That is to say, the threshold $\rho_{th}$ of the radius of curvature is required to satisfy an equation (18) shown below so that the vehicle 1 does not protrude from the lane when traveling along the path.

[Math 18]

$$\rho_{th} \leq \min\left\{\rho_{ck} + \frac{w_l - w_v}{2} \cdot \frac{\cos(\Delta\theta_k)}{1 - \cos(\Delta\theta_k)} | k = 1 \cdots M\right\} \quad (18)$$

The threshold of the radius of curvature determined provisionally based on the minimum turn radius of the vehicle 1, the travel speed of the vehicle, and the coefficient of friction between the tire of the vehicle and the road surface is herein $\rho_{th}'$. In this case, the threshold $\rho_{th}$ of the radius of curvature is only required to be determined according to the following equation (19):

[Math 19]

$$\rho_{th} = \min\left\{\rho_{th}', \min\left\{\rho_{ck} + \frac{w_l - w_v}{2} \cdot \frac{\cos(\Delta\theta_k)}{1 - \cos(\Delta\theta_k)} | k = 1 \cdots M\right\}\right\} \quad (19)$$

As described above, according to Embodiment 9, probability that the vehicle 1 does not protrude from the lane when traveling along the path can be improved.

<Hardware Configuration>

The functions of the parameter determination unit 23 and the filtering unit 24 of the travel path generation apparatus 19 described in Embodiment 1 are achieved by a processing circuit. That is to say, the travel path generation apparatus 19 includes a processing circuit to determine the cutoff frequency $\omega_c$, and perform low-pass filtering using the cutoff frequency $\omega_c$ on the values $\{x_i\}$ and $\{y_i\}$ along the axes in the Cartesian coordinate system of the sequence of points representing the lane shape. The processing circuit may be dedicated hardware, or may be a processor (also referred to as a CPU, a central processing unit, a processing unit, an arithmetic unit, a microprocessor, a microcomputer, and a digital signal processor (DSP)) to execute a program stored in memory.

Figure 14:
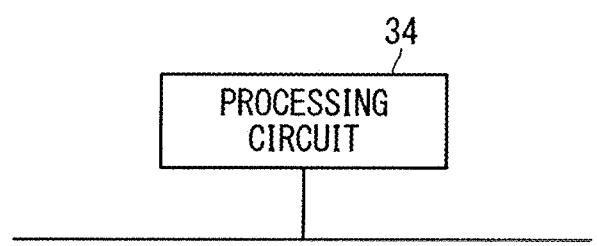
FIG. 14 shows an example of a hardware configuration of the travel path generation apparatus according to each of Embodiments 1 to 5.

When the processing circuit is the dedicated hardware, a processing circuit 34 corresponds to a single circuit, a composite circuit, a programmed processor, a parallel programmed processor, an application specific integrated circuit (ASIC), a field programmable gate array (FPGA), and a combination thereof, for example, as shown in FIG. 14. The functions of the parameter determination unit 23 and the filtering unit 24 may be achieved by discrete processing circuits 34, or may collectively be achieved by a single processing circuit 34.

Figure 15:
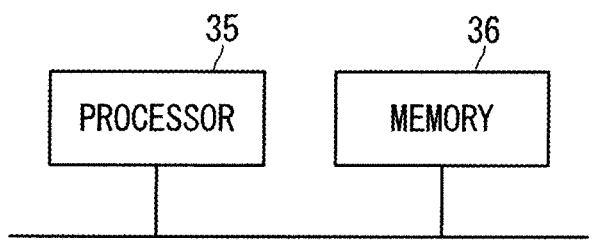
FIG. 15 shows an example of the hardware configuration of the travel path generation apparatus according to each of Embodiments 1 to 5.

When the processing circuit 34 is a processor 35 shown in FIG. 15, the functions of the parameter determination unit 23 and the filtering unit 24 are achieved by software, firmware, or a combination of software and firmware. Software or firmware is described as a program, and stored in memory 36. The processor 35 reads and executes the program stored in the memory 36 to achieve the functions. That is to say, the travel path generation apparatus 19 includes the memory 36 to store a program which results in performance of determining the cutoff frequency $\omega_c$, and performing low-pass filtering using the cutoff frequency $\omega_c$ on the values $\{x_i\}$ and $\{y_i\}$ along the axes in the Cartesian coordinate system of the sequence of points representing the lane shape. It can be said that the program causes a computer to execute procedures or methods of the parameter determination unit 23 and the filtering unit 24. The memory herein may be, for example, nonvolatile or volatile semiconductor memory, such as RAM, ROM, flash memory, erasable programmable read only memory (EPROM), and electrically erasable programmable read only memory (EEPROM), a magnetic disk, a flexible disk, an optical disc, a compact disc, a digital versatile disc (DVD), and the like or any storage medium to be used in the future.

One of the functions of the parameter determination unit 23 and the filtering unit 24 may be achieved by dedicated hardware, and the other function may be achieved by software or firmware.

As described above, the processing circuit can achieve the above-mentioned functions by hardware, software, firmware, or a combination thereof.

While the hardware configuration of the travel path generation apparatus 19 described in Embodiment 1 has been described above, the same applies to the hardware configuration of each of the travel path generation apparatuses 25, 27, 29, and 31 described respectively in Embodiments 2, 3, 4, and 5.

Embodiments can freely be combined with each other, and can be modified or omitted as appropriate within the scope of the present disclosure.

While the present disclosure has been described in detail, the foregoing description is in all aspects illustrative and not restrictive. It is understood that numerous unillustrated modifications can be devised.

EXPLANATION OF REFERENCE SIGNS 1 vehicle, 2 steering wheel, 3 steering shaft, 4 steering unit, 5 EPS motor, 6 forward-facing camera, 7 ranging sensor, 8 GNSS sensor, 9 navigation apparatus, 10 V2X receiver, 11 yaw rate sensor, 12 speed sensor, 13 acceleration sensor, 14 steering angle sensor, 15 steering torque sensor, 16 vehicle control unit, 17 EPS controller, 18 information acquisition unit, 19 travel path generation apparatus, 20 vehicle controller, 21 road information acquisition unit, 22 vehicle information acquisition unit, 23 parameter determination unit, 24 filtering unit, 25 travel path generation apparatus, 26 preprocessing unit, 27 travel path generation apparatus, 28 point sequence generation unit, 29 travel path generation apparatus, 30 path judgment unit, 31 travel path generation apparatus, 32 first travel path generation unit, 33 second travel path generation unit, 34 processing circuit, 35 processor, 36 memory.

The invention claimed is:

1. An apparatus comprising:
a processor to execute a program, and
a memory to store the program which, when executed by the processor, performs processes of
determining, based on approximation of lane shape, lane shape information by converting a first sequence of points representing lane shape into a second sequence of points;
determining a cutoff frequency based on spacing between points of the second sequence of points, each said point of the second sequence having location information, and a predetermined threshold of a radius of curvature, the second sequence of points representing a shape of a lane of a road in which a vehicle travels in a two-dimensional or three-dimensional Cartesian coordinate system;
performing low-pass filtering using the determined cutoff frequency on the location information of each of the points of the second sequence of points;
determining a travel path along which the vehicle is to travel for autonomous driving based on the low-pass filtering; and
outputting a target steering angle signal to control an electric power steering motor (EPS) of the vehicle to freely turn front wheels of the vehicle according to the determined travel path along which the vehicle is to travel for the autonomous driving.

2. The apparatus according to claim 1, wherein
when executed by the processor, the program further performs processes of
performing processing to convert the second sequence of points into a new sequence of points comprising equally spaced points,
using the new sequence of points obtained through conversion to determine the cutoff frequency, and
using the new sequence of points obtained through conversion to perform low-pass filtering.

3. The apparatus according to claim 1, wherein
when executed by the processor, the program further performs a process of
generating, when the shape of the lane is represented by a single parameter or a plurality of parameters, the second sequence of points based on the single parameter or the plurality of parameters.

4. The apparatus according to claim 1, wherein the threshold of the radius of curvature is determined based on at least one of a minimum turn radius of the vehicle, a travel speed of the vehicle and lateral acceleration of the vehicle, and the travel speed of the vehicle and a coefficient of friction between a tire of the vehicle and a road surface.

5. The apparatus according to claim 4, wherein the threshold of the radius of curvature is corrected based on a lateral width of the vehicle, a width of the lane, curvature of the lane, and an angular change of the lane.

6. The apparatus according to claim 1, wherein after the low-pass filtering is performed on the location information of each of the points of the second sequence of points in a forward direction, the low-pass filtering is performed in a reverse direction.

7. The apparatus according to claim 1, wherein
when executed by the processor, the program further performs a process of
calculating a deviation degree indicating a likelihood that a third sequence of points obtained through the low-pass filtering deviates from a path along which the vehicle travels, and
under a condition where the deviation degree is greater than a predetermined threshold of the deviation degree, the threshold of the radius of curvature is changed to determine the cutoff frequency.

8. The apparatus according to claim 1, wherein
when executed by the processor, the program further performs a process of
generating the travel path of the vehicle with reference to a third sequence of points obtained through the low-pass filtering, and
the travel path is generated according to predetermined constraints.

9. The apparatus according to claim 1, wherein the approximation of the lane shape is based on output of one or more sensors of the vehicle.

10. The apparatus according to claim 9, wherein the one or more sensors of the vehicle include a forward-facing camera configured to detect image information corresponding to the lane shape.

11. The apparatus according to claim 1, wherein the low-pass filtering removes any component whose radius of curvature is equal to or smaller than the threshold of the radius of curvature.

12. The apparatus according to claim 1, wherein
when executed by the processor, the program further performs a process of
determining the threshold of the radius of curvature prior to determining the cutoff frequency.

13. The apparatus according to claim 1, wherein
when executed by the processor, the program further performs a process of
controlling the vehicle via the control of the electric power steering motor (EPS) to move according to the determined travel path after the low-pass filtering such that a future threshold of the radius of curvature satisfies the following equation:

$$\rho_{th} \leq \min\left\{\rho_{ck} + \frac{W_l - W_v}{2} \cdot \frac{\cos(\Delta\theta_k)}{1 - \cos(\Delta\theta_k)} | k = 1 \ldots M\right\}$$

where $\rho_{th}$ is the future threshold of the radius of curvature, $\rho_{ck}$ is the threshold of the radius of curvature, $w_l$ is a width of the lane, $w_v$ is a lateral width of the vehicle, and $\Delta\theta_k$ is angular change.

14. A method comprising:
determining, based on approximation of lane shape, lane shape information by converting a first sequence of points representing lane shape into a second sequence of points;
determining a cutoff frequency based on spacing between points of the second sequence of points, each said point of the second sequence having location information, and a predetermined threshold of a radius of curvature, the second sequence of points representing a shape of a lane of a road in which a vehicle travels in a two-dimensional or three-dimensional Cartesian coordinate system;
performing low-pass filtering using the determined cutoff frequency on the location information of each of the points of the second sequence of points;
determining a travel path along which the vehicle is to travel for autonomous driving based on the low-pass filtering; and
outputting a target steering angle signal to control an electric power steering motor (EPS) of the vehicle to freely turn front wheels of the vehicle according to the determined travel path along which the vehicle is to travel for the autonomous driving.

15. The method according to claim 14, further comprising determining the approximation of the lane shape based on output of one or more sensors of the vehicle.

16. A vehicle comprising:
circuitry configured to
determine, based on approximation of lane shape, lane shape information by converting a first sequence of points representing lane shape into a second sequence of points;
determine a cutoff frequency based on spacing between points of the second sequence of points, each said point of the second sequence having location information, and a threshold of a radius of curvature, the second sequence of points representing a shape of a lane of a road in which a vehicle travels in a two-dimensional or three-dimensional Cartesian coordinate system;
perform low-pass filtering using the determined cutoff frequency on the location information of each of the points of the second sequence of points;
determine a target steering angle signal to control an electric power steering motor (EPS) of the vehicle to freely turn front wheels of the vehicle according to a determined travel path along which the vehicle is to travel for the autonomous driving; and
control the electric power steering motor (EPS) of the vehicle to freely turn the front wheels of the vehicle according to the determined target steering angle to autonomously control the vehicle according to the determined travel path along which the vehicle is to travel for the autonomous driving.

17. The vehicle according to claim 16, wherein the circuitry is configured to generate the travel path of the vehicle with reference to another sequence of points obtained through the low-pass filtering.

18. The vehicle according to claim 16, wherein the low-pass filtering removes any component whose radius of curvature is equal to or smaller than the threshold of the radius of curvature.

19. The vehicle according to claim 16, further comprising:
the electric power steering motor (EPS),
wherein the circuitry is configured to determine, based on approximation of lane shape according to output of one or more sensors of the vehicle, lane shape information by converting an initial sequence of points representing lane shape into the second sequence of points in the two-dimensional or three-dimensional Cartesian coordinate system, and
wherein the one or more sensors of the vehicle include a forward-facing camera configured to detect image information corresponding to the lane shape.

* * * * *